United States Patent

Olgren et al.

[11] Patent Number: 5,878,832
[45] Date of Patent: Mar. 9, 1999

[54] STEERING APPARATUS FOR MOTOR VEHICLE

[75] Inventors: Leland Nels Olgren, Frankenmuth; Hamid Vahabzadeh, Oakland; Madhu Raghavan, Bloomfield Hills, all of Mich.

[73] Assignee: General Motors Corporation, Detroit, Mich.

[21] Appl. No.: 910,360

[22] Filed: Aug. 13, 1997

[51] Int. Cl.[6] .................................................. B62D 5/04
[52] U.S. Cl. ................... 180/444; 74/492; 464/89
[58] Field of Search ................ 280/775; 180/444, 180/443; 74/492; 464/162, 89

[56] References Cited

U.S. PATENT DOCUMENTS

| | | | |
|---|---|---|---|
| 2,154,077 | 4/1939 | Sampson | 64/11 |
| 2,468,985 | 5/1949 | Krotz | 464/89 |
| 3,165,065 | 1/1965 | Stickel | 103/117 |
| 4,464,141 | 8/1984 | Brown | 464/75 |
| 4,629,024 | 12/1986 | Buike et al. | 180/444 |
| 4,667,530 | 5/1987 | Mettler et al. | 74/493 |
| 5,187,997 | 2/1993 | Henry-Moore | 74/493 |
| 5,259,818 | 11/1993 | Kachi et al. | 464/89 |
| 5,348,345 | 9/1994 | Dykema et al. | 280/777 |
| 5,383,811 | 1/1995 | Campbell et al. | 464/89 |
| 5,460,574 | 10/1995 | Hobaugh | 464/162 |
| 5,507,203 | 4/1996 | Audibert et al. | 464/162 |
| 5,730,657 | 3/1998 | Olgren | 464/157 |

*Primary Examiner*—Paul N. Dickson
*Attorney, Agent, or Firm*—Dean L. Ellis; Saul Schwartz

[57] ABSTRACT

A steering apparatus for a motor vehicle including a steering column and an electric power assist apparatus. The steering column includes a mast jacket, a steering shaft rotatably supported on the mast jacket, and a steering hand wheel on the steering shaft. The electric power assist apparatus includes a speed reducer on the mast jacket and an electric motor. A worm wheel of the speed reducer is rigidly connected to an output shaft of the speed reducer which, in turn, is connected to a steering gear of the motor vehicle. A worm gear of the speed reducer is driven by the electric motor and meshes with the worm wheel to transfer the torque of the electric motor to the speed reducer output shaft. A tubular reference shaft is rotatably supported on the speed reducer housing. A torsion bar in the tubular reference shaft has a lower end connected to the speed reducer output shaft and an upper end connected to the reference shaft and to the steering shaft through a stroking universal coupling which isolates the reference shaft and the speed reducer output shaft from lateral runout of the steering shaft.

6 Claims, 5 Drawing Sheets

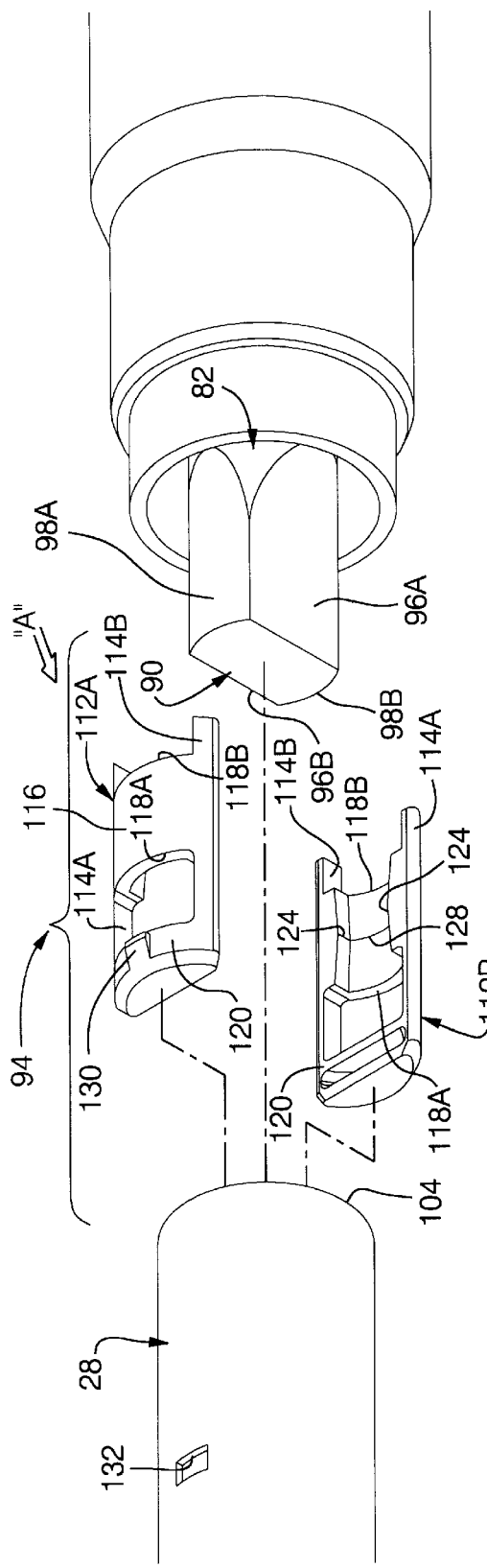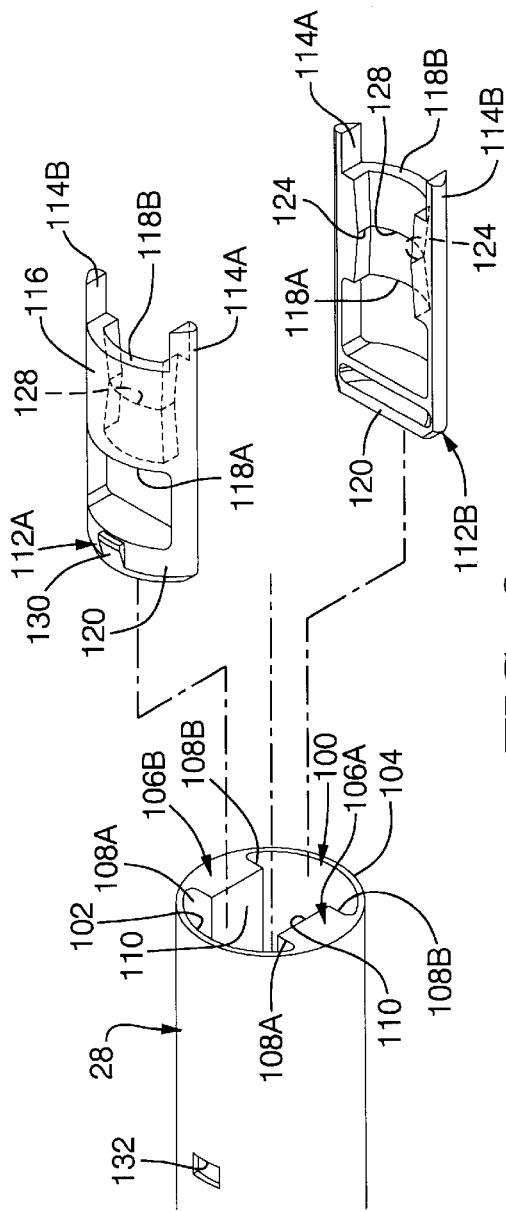

STEERING APPARATUS FOR MOTOR VEHICLE

TECHNICAL FIELD

This invention relates to a steering apparatus for a motor vehicle.

BACKGROUND OF THE INVENTION

U.S. Ser. No. 08/821,607, now U.S. Pat. No. 5,730,657, filed Mar. 20, 1997 and assigned to the assignee of this invention, describes a motor vehicle steering apparatus including a steering column and an electric power assist apparatus on the steering column. The steering column includes a stationary mast jacket, a steering shaft rotatably supported on the mast jacket, and a steering hand wheel at an outboard end of the steering shaft. The electric power assist apparatus includes an electric motor and a speed reducer mounted on the mast jacket. A worm wheel of the speed reducer is rigidly connected to an output shaft of the speed reducer which, in turn, is connected to a steering gear of the motor vehicle. A worm gear of the speed reducer is driven by the electric motor and meshes with the worm wheel to transfer the torque of the electric motor to the speed reducer output shaft. The steering shaft is connected to the speed reducer output shaft through a torsion bar which resiliently twists when manual effort is applied at the steering hand wheel. A torque sensor on the speed reducer monitors relative rotation between the steering shaft and the speed reducer output shaft, and an electronic control module turns the electric motor on and off in accordance with signals from the torque sensor. The steering shaft is articulated between the steering hand wheel and the speed reducer in order to isolate the torque sensor from lateral runout of the steering shaft relative to the mast jacket. The steering apparatus according to this invention is a novel alternative to the steering apparatus described in the aforesaid U.S. Ser. No. 08/821,607.

SUMMARY OF THE INVENTION

This invention is a new and improved steering apparatus for a motor vehicle including a steering column and an electric power assist apparatus. The steering column includes a mast jacket, a steering shaft rotatably supported on the mast jacket, and a steering hand wheel on the steering shaft. The electric power assist apparatus includes a speed reducer on the mast jacket and an electric motor. A worm wheel of the speed reducer is rigidly connected to an output shaft of the speed reducer which, in turn, is connected to a steering gear of the motor vehicle. A worm gear of the speed reducer is driven by the electric motor and meshes with the worm wheel to transfer the torque of the electric motor to the speed reducer output shaft. A tubular reference shaft is rotatably support on the speed reducer housing. A torsion bar in the tubular reference shaft has a lower end connected to the speed reducer output shaft and an upper end connected to the reference shaft and to the steering shaft through a stroking universal coupling which isolates the reference shaft from lateral runout of the steering shaft.

BRIEF DESCRIPTION OF THE DRAWINGS

FIG. 7 is a fragmentary exploded perspective view of the stroking universal coupling of the motor vehicle steering apparatus according to this invention;

FIG. 8 is a fragmentary exploded perspective view of the stroking universal coupling of the motor vehicle steering apparatus according to this invention taken in the direction "A" in FIG. 7.

DESCRIPTION OF THE PREFERRED EMBODIMENT

Figure 1:
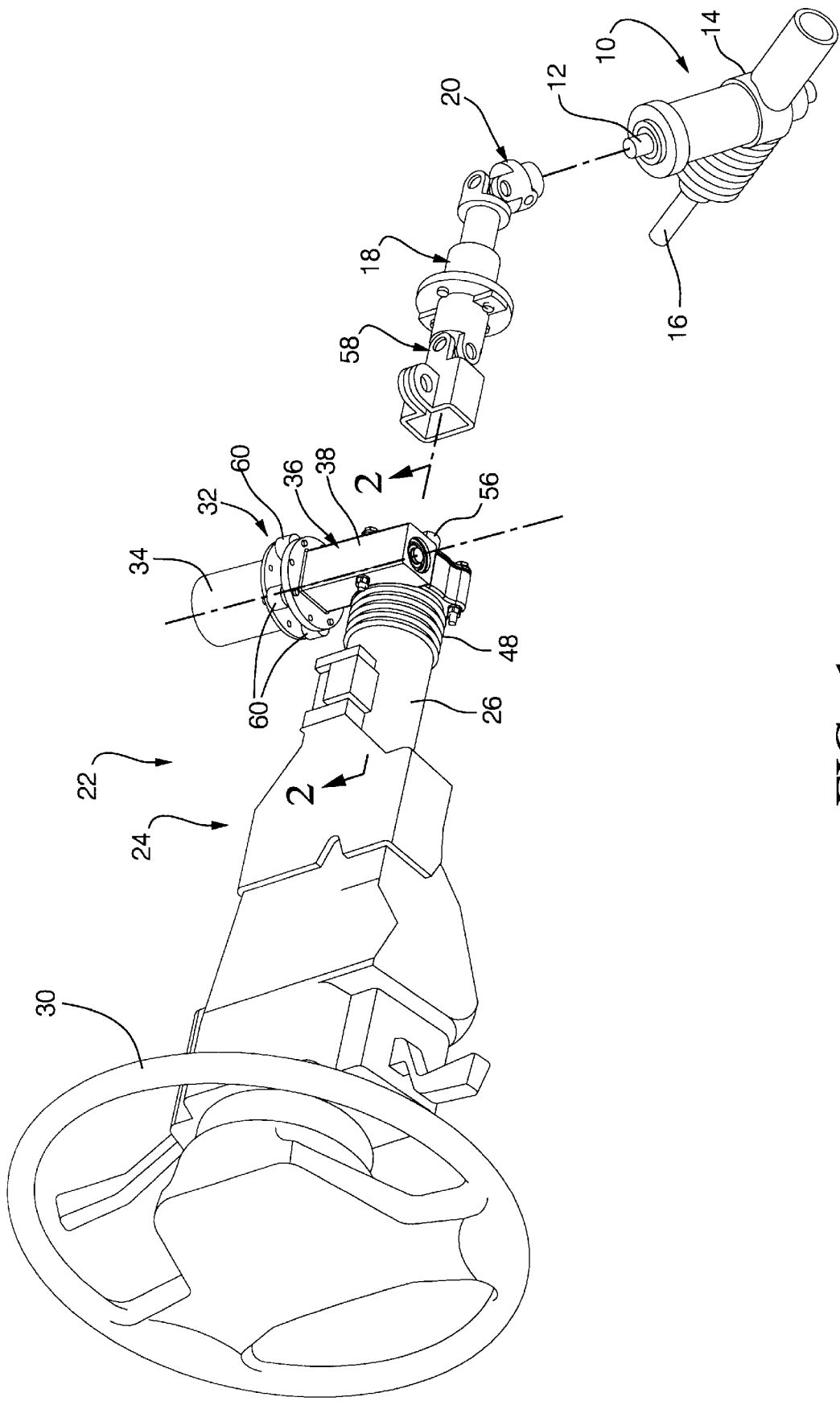
FIG. 1 is a perspective view of a motor vehicle steering apparatus according to this invention.

Referring to FIG. 1, a motor vehicle, not shown, has mounted thereon a steering gear 10 having an input shaft 12 rotatably supported on a housing 14 of the steering gear and a rack bar 16 supported on the housing 14 for back and forth linear translation in response to rotation of the input shaft. Opposite ends, not shown, of the rack bar are linked to dirigible wheels of the motor vehicle for steering the wheels in response to rotation of the input shaft 12. An intermediate steering shaft 18 has a first universal joint 20 connected to the steering gear input shaft 12 and spans a gap between the latter and a motor vehicle steering apparatus 22 according to this invention.

Figure 2:
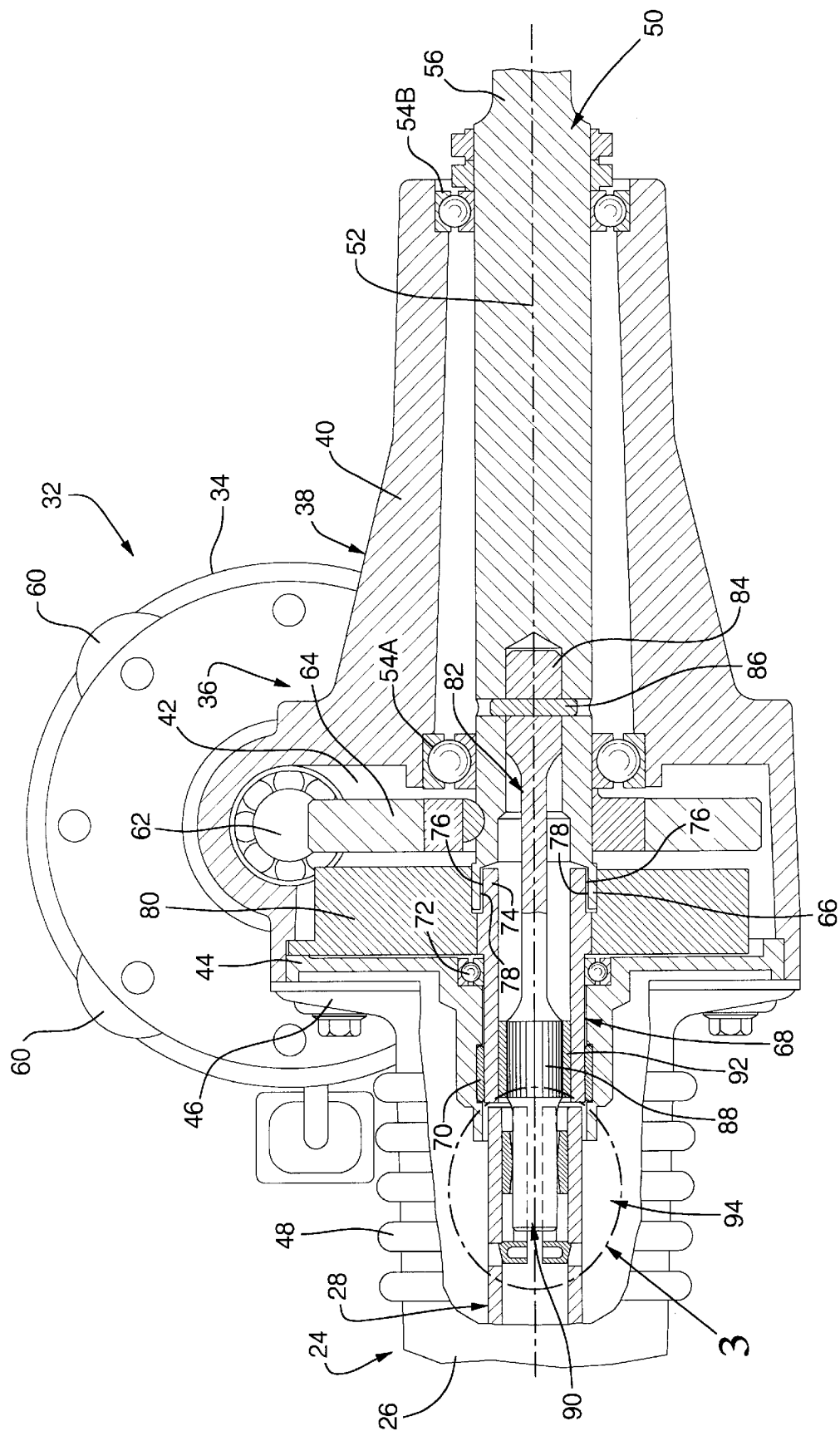
FIG. 2 is an enlarged sectional view taken generally along the plane indicated by lines 2—2 in FIG. 1.
Figure 3:
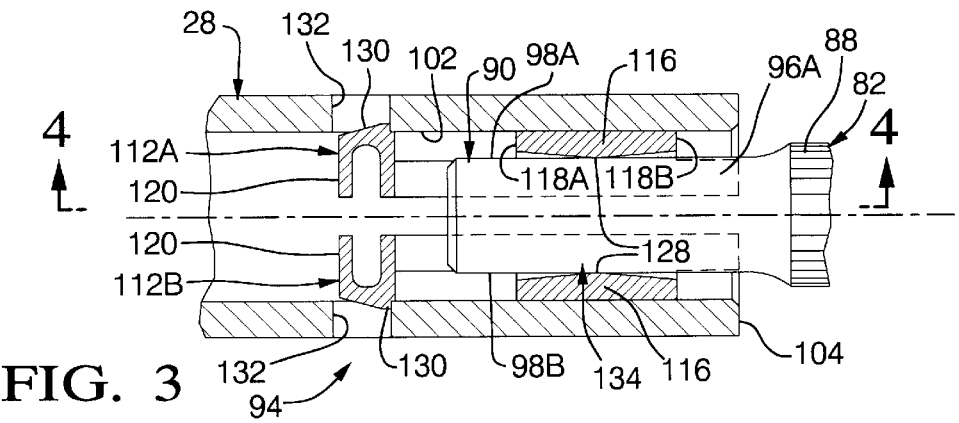
FIG. 3 is an enlarged view of the portion of FIG. 2 identified by the reference circle 3 in FIG. 2.
Figure 4:
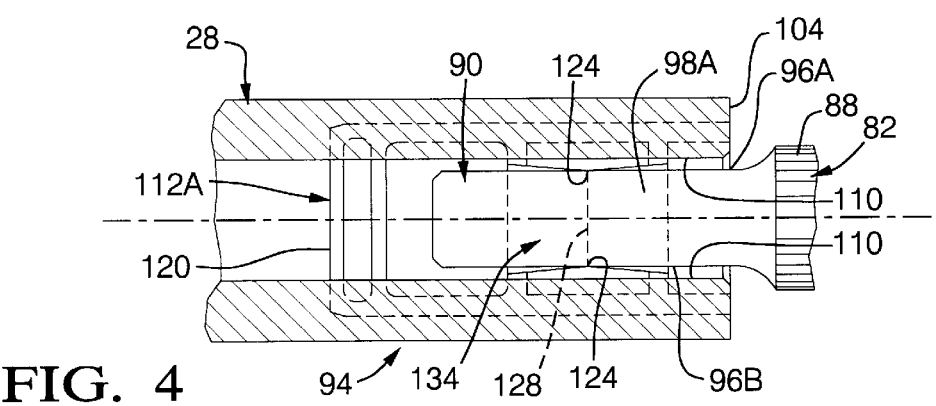
FIG. 4 is a sectional view taken generally along the plane indicated by lines 4—4 in FIG. 3.
Figure 5:
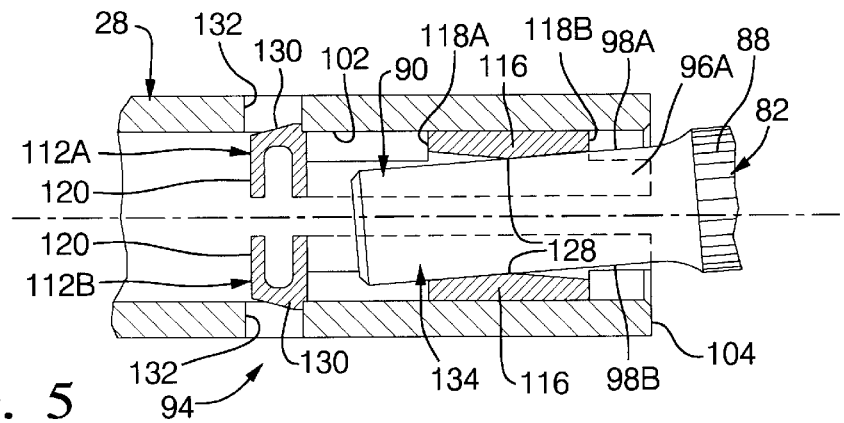
FIG. 5 is similar to FIG. 3 showing elements of a stroking universal coupling of the motor vehicle steering apparatus according to this invention in different relative positions.
Figure 6:
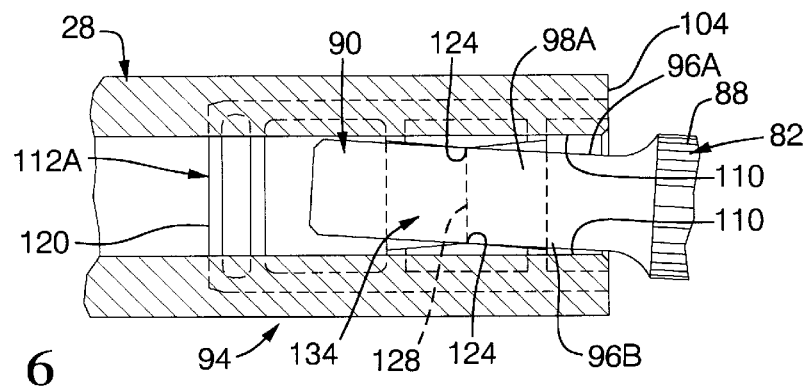
FIG. 6 is similar to FIG. 4 showing elements of the stroking universal coupling of the motor vehicle steering apparatus according to this invention in different relative positions.
Figure 9:
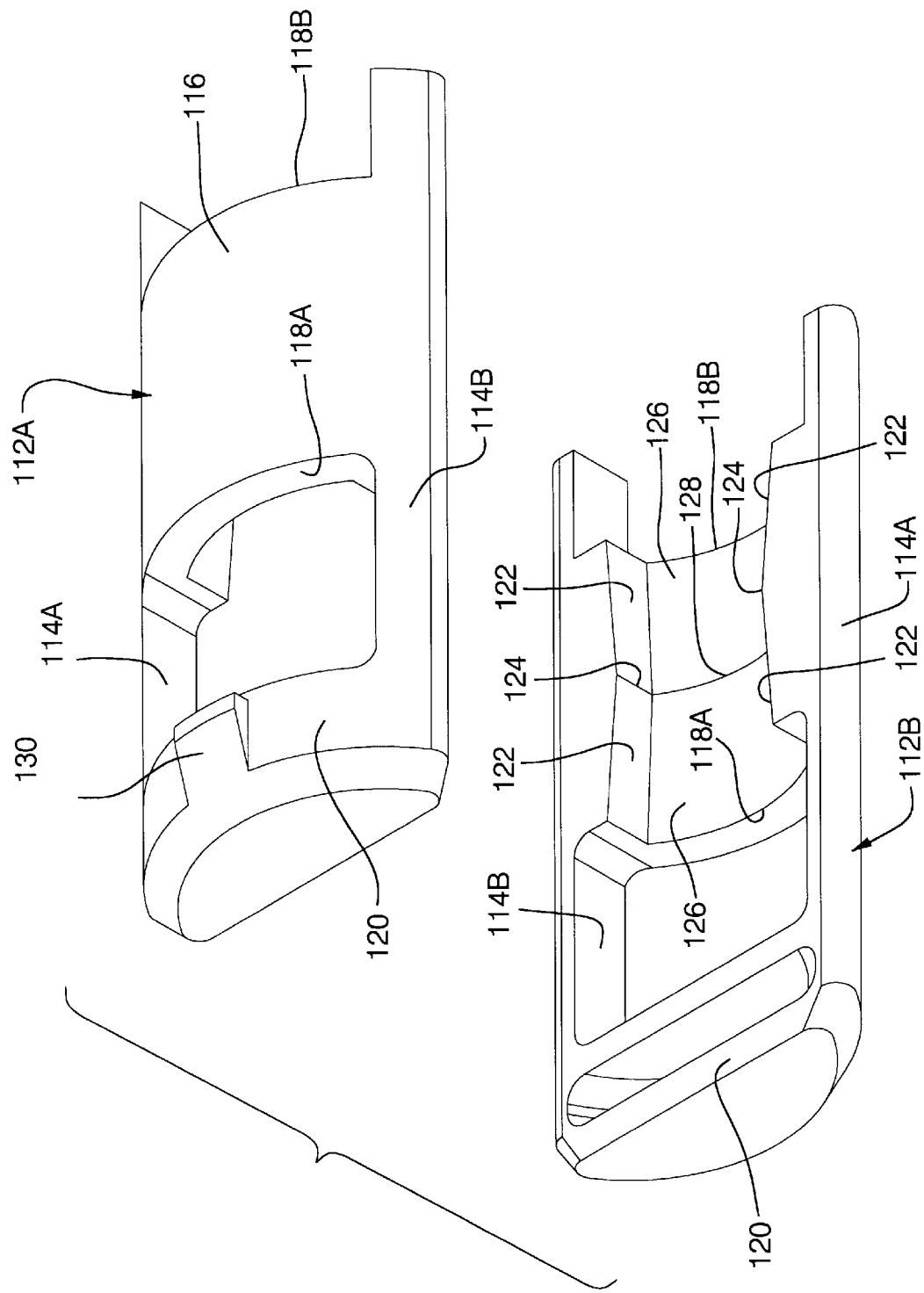
FIG. 9 is a perspective view of a pair of plastic inserts of the stroking universal coupling of the motor vehicle steering apparatus according to this invention.

The steering apparatus 22 includes a steering column 24 having a mast jacket 26 adapted for support on a body structure, not shown, of the motor vehicle. A steering shaft 28, FIG. 2, is rotatably supported on the steering column 24 within the mast jacket 26. A steering hand wheel 30 is rigidly attached to the steering shaft for unitary rotation therewith.

An electric power assist apparatus 32 of the steering apparatus 22 includes an electric motor 34 and a speed reducer 36. The speed reducer 36 includes a housing 38 having a bearing carrier portion 40 and an internal chamber 42 closed by an end plate 44. A flange 46 on a corrugated lower end 48 of the steering column mast jacket 26 is bolted to the speed reducer housing 38 over the end plate 44 whereby the speed reducer housing is rigidly mounted on the steering column.

An output shaft 50 of the speed reducer 36 is supported on the bearing carrier portion 40 of the speed reducer housing with great precision for rotation about a longitudinal centerline 52 of the speed reducer housing by a pair of ball bearings 54A, 54B. The precision mounting of the speed reducer output shaft 50 minimizes lateral runout thereof relative to the longitudinal centerline 52. A lower end 56 of the speed reducer output shaft is connected to the intermediate steering shaft 18 by a second universal joint 58 on the intermediate steering shaft so that rotation of the speed reducer output shaft induces corresponding rotation of the steering gear input shaft 12. The speed reducer output shaft may be connected directly to the steering gear input shaft 12.

The electric motor 34 is mounted on the speed reducer housing 38 through a plurality of vibration isolators 60. A worm gear 62 of the speed reducer 36 is rotatably supported on the speed reducer housing 38 and connected to an output shaft, not shown, of the electric motor so that the latter drives the worm gear when the electric motor is on. The worm gear 62 meshes with a worm wheel 64 rigidly attached to the speed reducer output shaft 50 near a tubular upper end 66 of the latter. When the electric motor is on, output torque of the electric motor is applied to the speed reducer output shaft 50 through the worm gear 62 and the worm wheel 64 to induce rotation of the speed reducer output shaft.

A tubular reference shaft 68 of the steering apparatus 22 is supported on the speed reducer housing 38 with great precision for rotation about the longitudinal centerline 52 of the speed reducer housing by a sleeve bearing 70 and a ball bearing 72 on the end plate 44. A lower end 74 of the reference shaft 68 nests inside of the tubular upper end 66 of the speed reducer output shaft 50. A pair of outside flat sides 76 on the lower end 74 of the reference shaft face a corresponding pair of inside flat sides 78 on the upper end of the speed reducer output shaft and cooperate in defining a lost motion connection which affords about ±2° of relative rotation between the two shafts before a positive driving connection is established. A schematically represented torque sensor 80 in the chamber 42 in the speed reducer housing monitors rotation of the reference shaft 68 about the longitudinal centerline 52 relative to the speed reducer output shaft.

As seen best in FIG. 2, a torsion bar 82 of the steering apparatus 22 is disposed in the tubular reference shaft 68 and in the tubular upper end 66 of the speed reducer output shaft. A lower end 84 of the torsion bar is rigidly connected to the speed reducer output shaft 50 by a pin 86. An integral serrated barrel 88 on the torsion bar 82 near an upper end 90 thereof is connected to the reference shaft 68 through a bushing 92 so that the reference shaft rotates as a unit with the upper end 90 of the torsion bar.

As seen best in FIGS. 2–9, a stroking universal coupling 94 is disposed between the torsion bar 82 and the steering shaft 28 and includes a diametrically opposite pair of side surfaces 96A, 96B and a diametrically opposite pair of edge surfaces 98A, 98B on the torsion bar at the upper end 90 thereof. An outer socket 100, FIG. 8, of the coupling 94 is defined by a cylindrical cavity 102 in a lower end 104 of the steering shaft 28. The cylindrical outer socket 100 is interrupted by a diametrically opposite pair of linear bosses 106A, 106B in the cavity each having a pair of longitudinal sides 108A, 108B and a lateral side 110.

The stroking universal coupling 94 further includes a pair of identical plastic inserts 112A, 112B molded from a material such as acetyl. Each plastic insert 112A, 112B has a pair of relatively long and narrow runners 114A, 114B shaped on the outside to fit in the outer socket 100 on the longitudinal sides 108A, 108B of the linear bosses 106A, 106B. The runners 114A, 114B of the plastic inserts are connected by an integral arc-shaped web 116 having a pair of opposite ends 118A, 118B and by an integral reinforcement 120. As seen best in FIG. 9, a pair of narrow ramps 122 on each runner 114A, 114B between the ends 118A, 118B of the web 116 converge to a linear apex 124. A pair of wide ramps 126 on the concave side of the web 116 converge to a linear apex 128 contiguous with the linear apexes 124. Each reinforcement 120 has a barb 130 on a convex side thereof.

The plastic inserts 112A, 112B are fitted in the outer socket 100 through the lower end 104 of the steering shaft 28 by sliding the runners 114A, 114B along the longitudinal sides 108A, 108B of the linear bosses 106A, 106B in the outer socket. The runners 114A, 114B are resiliently squeezed in the outer socket against the longitudinal sides of the linear bosses 106A, 106B to eliminate lash between the inserts and the outer socket, i.e., to eliminate dimensional clearance which would otherwise permit relative rotation between the plastic inserts and the steering shaft. At a seated position of each of the plastic inserts in the outer socket 100, FIGS. 2–6, the barbs 130 snap into respective ones of a pair of windows 132 in the steering shaft which cooperate with the barbs in preventing dislodgment of the plastic inserts from the outer socket.

In the seated positions of the plastic inserts 112A, 112B, the narrow ramps 122 on the runners 114A, 114B overhang corresponding ones of the lateral sides 110 of the linear bosses 106A, 106B in the outer socket 100 and cooperate with the wide ramps 126 on the webs 116 in defining a four-sided inner socket 134, FIGS. 3–6, of the stroking universal coupling 94 inside of the outer socket 100. The cross sectional area of the inner socket 134 is minimum in the plane of the apexes 124, 128 and expands in the length direction of the steering shaft 28 to maximum in the planes of the ends 118A, 118B of the webs 116.

As seen best in FIGS. 2–6, the upper end 90 of the torsion bar 82 is interference fitted in the inner socket 134 of the stroking universal coupling 94 with the side surfaces 96A, 96B and the edge surfaces 98A, 98B of the upper end of the torsion bar resiliently deforming the apexes 124, 128, respectively, on the plastic inserts. The plastic inserts 112A, 112B transfer torque to the torsion bar with zero lash therebetween, i.e., zero dimensional clearance which would otherwise permit relative rotation between the plastic inserts and the upper end 90 of the torsion bar.

By virtue of the low coefficient of friction of the plastic from which the inserts 112A, 112B are molded and by virtue of the limited contact area between the apexes 124, 128 and the upper end of the torsion bar, the upper end of the torsion bar is slidable with nominal frictional resistance back and forth in the inner socket 134 in the length direction of the steering shaft 28. At the same time, the apexes 124, 128 define fulcrums about which the steering shaft 28 is pivotable relative to the torsion bar in a first direction, FIGS. 3 and 5. Similarly, the apexes 124, 128 define fulcrums about which the steering shaft 28 is pivotable relative to the torsion bar in a second direction, FIGS. 4 and 6, perpendicular to the first direction so that the stroking universal coupling 94 accommodates universal articulation and linear stroking of the steering shaft 28 relative to the upper end 90 of the torsion bar 82.

The motor vehicle steering apparatus 22 operates as follows. In the absence of manual effort applied at the steering hand wheel 30, the torsion bar 82 is unflexed and defines a common center position of the steering shaft 28 and of the reference shaft 68 relative to the speed reducer output shaft 50. An electronic signal from the torque sensor 80 to a control module, not shown, of the motor vehicle corresponding to the reference shaft 68 being in its center position induces the control module to turn off the electric motor 34.

When manual effort is applied at the steering hand wheel 30 to steer the motor vehicle, such effort is transferred through the stroking universal coupling 94 to the upper end 90 of the torsion bar 82. The upper end of the torsion bar and the reference shaft 68 rotate as a unit with the steering shaft relative to the speed reducer output shaft 50 and the lower end 84 of the torsion bar because of resistance to rotation of the speed reducer output shaft attributable to the dirigible wheels of the motor vehicle. The corresponding twist of the torsion bar induces a restoring force urging the steering shaft and the reference shaft back to their center positions.

The torque sensor 80 senses the magnitude and direction of relative rotation between the reference shaft and the speed reducer output shaft and sends a corresponding electronic signal to the aforesaid control module to turn on the electric motor 34 in the appropriate direction so that the output torque of the electric motor is applied to the speed reducer output shaft 50 to supplement the manual effort transferred to the speed reducer output shaft through the lower end of the torsion bar. When manual effort at the steering hand wheel ceases, the torsion bar returns the steering shaft 28 and the reference shaft 68 to their center positions.

Importantly, concurrent with torque transfer between the steering shaft 28 and the torsion bar 82, the stroking universal coupling 94 isolates each of the reference shaft 68 and the speed reducer output shaft 50 mounted with high precision on the speed reducer housing 38 from lateral runout of the steering shaft thereby to minimize the effect of such lateral runout on the torque sensor 80. In the event that the manual effort applied at the steering hand wheel 30 overpowers the torsion bar 82, e.g., when steering with the electric motor off, the flat sides 76 on the reference shaft bear against the flat sides 78 on the speed reducer output shaft 50 to effect a positive driving connection therebetween after about ±2° of relative rotation of the reference shaft from its center position.

Having thus described the invention, what is claimed is:

1. A motor vehicle steering apparatus comprising:
   a steering column mast jacket,
   a steering shaft rotatably supported on said steering column mast jacket having a steering hand wheel at an upper end of said steering shaft,
   a speed reducer housing rigidly attached to said steering column mast jacket,
   an electric motor mounted on said speed reducer housing,
   a speed reducer output shaft rotatably supported on said speed reducer housing,
   a gear drive means including a first gear driven by said electric motor and a second gear rigidly attached to said speed reducer output shaft meshing with said first gear whereby output torque of said electric motor is transferred to said speed reducer output shaft,
   a tubular reference shaft rotatably supported on said speed reducer housing,
   a torsion bar in said tubular reference shaft having a first end rigidly attached to said speed reducer output shaft and a second end protruding beyond a corresponding end of said tubular reference shaft,
   a connecting means operative to connect said tubular reference shaft to said torsion bar for rotation as a unit with said second end of said torsion bar, and
   a stroking universal coupling means operative to couple together for unitary rotation with substantially zero lash therebetween said steering shaft and said second end of said torsion bar while permitting universal pivotal movement of said steering shaft relative to said torsion bar and linear translation of said second end of said torsion bar relative to said steering shaft in the length direction of said steering shaft.

2. The motor vehicle steering apparatus recited in claim 1 further comprising:
   a lost motion means operative to effect a rigid driving connection between said tubular reference shaft and said speed reducer output shaft at a predetermined angle of relative rotation therebetween in either of a pair of opposite directions from a center position of said tubular reference shaft established by said torsion bar.

3. The motor vehicle steering apparatus recited in claim 2 wherein said stroking universal coupling means comprises:
   an outer socket in a lower end of said steering shaft,
   a pair of diametrically opposite side surfaces on said torsion bar at said second end thereof and a pair of diametrically opposite edge surfaces on said torsion bar at said second end, and
   a pair of diametrically opposite plastic inserts in said outer socket,
   means operative to prevent relative rotation between said steering shaft and each of said pair of plastic inserts in said outer socket, and
   a plurality of angled ramps on each of said pair of plastic inserts extending in the length direction of said steering shaft and converging to a plurality of apexes which cooperate in defining an inner socket in said outer socket resiliently engaging each of said pair of diametrically opposite side surfaces and each of said pair of diametrically opposite edge surfaces on said torsion bar.

4. The motor vehicle steering apparatus recited in claim 3 wherein said means operative to prevent relative rotation between said steering shaft and each of said pair of plastic inserts in said outer socket comprises:
   a pair of diametrically opposite linear bosses on said steering shaft in said outer socket extending in the length direction of said steering shaft each having a pair of longitudinal sides thereon, and
   a pair of runners on each of said plastic inserts slidably engaging and resiliently squeezed against said longitudinal sides of said pair of diametrically opposite linear bosses.

5. The motor vehicle steering apparatus recited in claim 4 further comprising:
   a snap-in retainer means operative to prevent dislodgment of each of said pair of plastic inserts from said outer socket.

6. The motor vehicle steering apparatus recited in claim 5 wherein said snap-in retainer means comprises:
   a pair of windows in said steering shaft, and
   a pair of barbs on respective ones of said pair of plastic inserts seated in respective ones of said pair of windows in a seated position of each of said plastic inserts in said outer socket.

* * * * *